Jan. 11, 1944. J. W. ALBIN 2,339,130
THREADED ATTACHMENT
Filed April 17, 1941
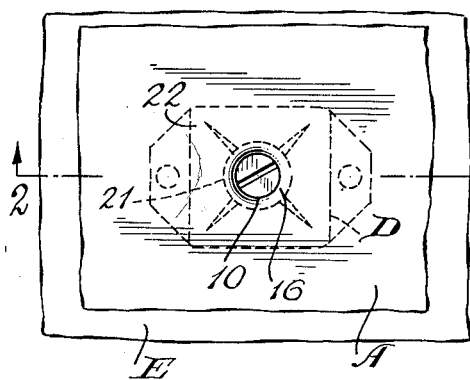
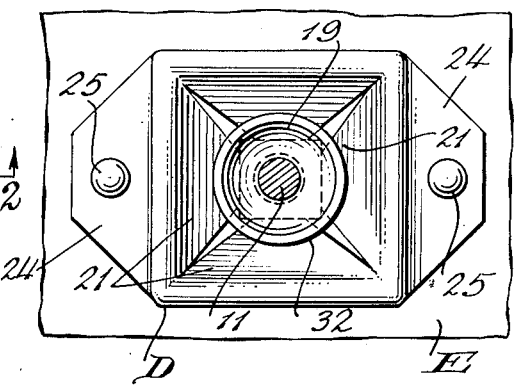
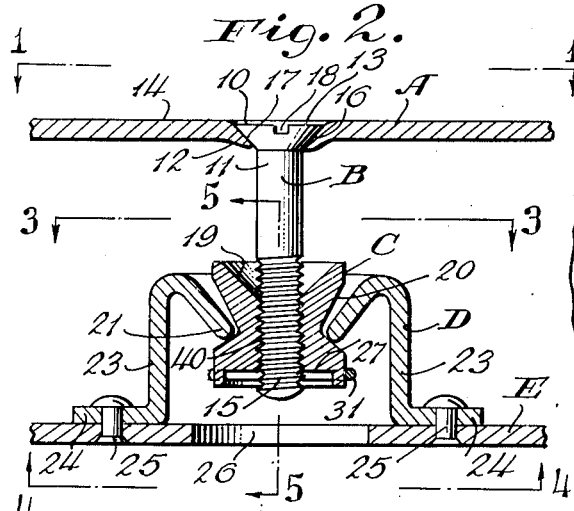
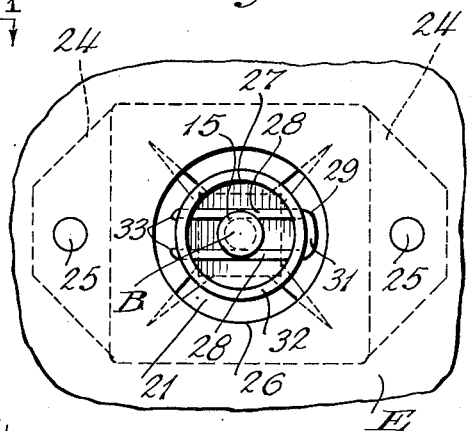
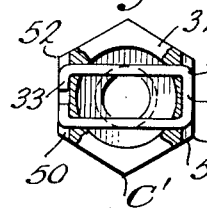
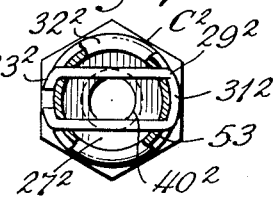
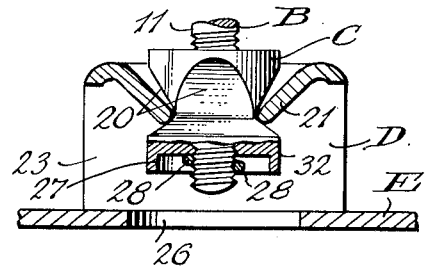
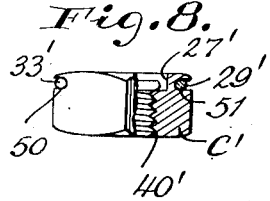
INVENTOR.
JEREMIAH W. ALBIN
BY
Richards & Geier
ATTORNEYS Patented Jan. 11, 1944

2,339,130

UNITED STATES PATENT OFFICE 2,339,130

THREADED ATTACHMENT

Jeremiah W. Albin, Babylon, N. Y.

Application April 17, 1941, Serial No. 388,991

1 Claim. (Cl. 85—32)

The present invention relates to a threaded attachment and particularly it relates to a self-locking threaded attachment.

Although it has a broad application to lock nuts to be fitted upon or used in connection with any type of bolt, the present invention will be illustratively described in connection with its application to threaded connections or attachments where two members are to be connected together which are spaced from one another, as for example, where the bolt or screw must be inserted through an opening or recess in a cover plate and caused to engage a member substantially removed from or spaced from said cover plate.

In constructions of this character considerable difficulty is encountered due to the fact that the bolt does not readily find its seat or threaded connection, and further difficulty is encountered in that the bolt when screwed into position will tend to become loose since it is not readily possible to apply an extra lock nut to prevent it from loosening or turning within the nut to which it has been applied.

It is among the objects of the present invention to provide a self-locking bolt and nut device of simple inexpensive construction not requiring a locking nut.

A further object of the present invention is to provide an improved threaded bolt connection in which the bolt, although inserted at a distance or spacing from the nut or member which it is to engage will promptly find its seat without substantial difficulty and manipulation, and which when engaged in its connection will be firmly held against loosening caused by vibration even without the attachment of an extra lock nut.

Still further objects and advantages will appear from the more detailed description set forth below, it being understood, however, that this more detailed description is given by way of illustration since various changes therein may be made by those skilled in the art without departing from the scope and spirit of the invention.

In accomplishing the above objects it has been found most satisfactory according to one embodiment of the present invention to provide a nut which carries a member resiliently to engage the thread of the bolt particularly after the thread of the bolt has been engaged in the nut and is in position to be threaded into the nut.

In the preferred construction the resilient engagement is achieved by extending a single wire or U-shaped wire member across the outlet opening of the threaded engagement member or the nut, the spacing between the wires shall be such in respect to the axis of bolt and thread opening in the nut that the thread will have to push away and exert pressure sidewardly against the wires to push them out of the way when the bolt is threaded into position.

Desirably, these wires are positioned on the outlet side of the nut so that the thread will not engage such wires until it has already found its thread and until it has been practically threaded most of the way through the nut.

In one preferred form of application of this automatic lock nut arrangement, the nut may be supported on a member or plate substantially spaced or removed from the member or plate on which the bolt is mounted or into which the bolt is inserted. Desirably, the nut is so fixed that it will have an enlarged inlet receptacle which will engage the threaded end of the bolt even though the bolt be canted, and which will guide said threaded end of the bolt into the threaded recess.

This construction is of value even without the automatic locking arrangement above described, but in the preferred form of construction where the device is to be used upon airplanes, automobiles and machinery subject to vibration during usage it is practically always necessary to use the automatic resilient locking arrangement.

Referring to the drawing which illustrates several of the various possible embodiments of the present invention, but to which the present invention is by no means restricted since the drawing is merely by way of illustration and not by way of limitation.

In the drawing:

Fig. 1 is a top plan view of a threaded connection device according to my invention showing the head of the bolt or screw member.

Fig. 2 is a transverse sectional view upon the line 2—2 of Fig. 1.

Fig. 3 is a transverse sectional view upon the line 3—3 of Fig. 2.

Fig. 4 is a bottom view from the line 4—4 of Fig. 2.

Fig. 5 is a fragmentary transverse sectional view upon the line 5—5 of Fig. 2.

Fig. 6 to Fig. 9 are views of nut constructions which may be utilized with the bolts of Figs. 1 to 4 in general application, Figs. 6 and 7 showing alternative nut constructions in bottom view with the structure partly broken away and sectioned, and Figs. 8 and 9 being side views.

Referring to Figs. 1 to 5, there is provided a mounting member A for the bolt or screw B.

The bolt B engages the nut C which is provided with a mount D upon the plate member E.

As indicated, the plate A may take the form of a cover or closure for a recess opening or receptacle, such as an airplane, automobile or machine. The plate A is provided with an opening 10 in which the shank 11 of the bolt B may be inserted.

The opening 10 is slightly bellied downwardly as indicated at 12, so as to maintain the head or top 13 of the bolt B slightly below the surface 14 of the plate A. The end of the shank 11 of the bolt B is threaded as indicated at 15.

The sides of the opening 10 are bevelled as indicated at 16 to receive the conical sides 17 of the head 10 of the bolt B. It will be noted that the bolt B has a fillister slot 18.

The nut member C has a tapped opening 40 with a conical inlet recess 10 which is engaged by the threaded shank 15 substantially regardless of slight inclination or canting of the bolt B when inserted through the opening 10 to engage the nut C.

The sides of the nut C are provided with a peripheral recess or groove 20 into which project the downwardly bent fingers 21 which are formed from the plate 22, having the side flanges 23, and the feet 24 which are riveted at 25 onto the plate E.

It is thus seen that the mount D is formed of one piece and that an opening 26 is provided below the mount D in the plate E to enable access.

The base of the nut C is recessed as indicated at 27 and in the sides of said recess are mounted the legs 28 of said U-shaped resilient member 29. The legs 28 engage in the base of the thread as indicated best in Fig. 4, and are spaced apart slightly less when disengaged from the thread portion 15 of the bolt B than the diameter to which they are pressed apart when the bolt is inserted.

It will be noted that the base 31 of the U-shaped wire 29 is at one side of the ridge 32, while the ends 33 of the legs are bent over the outside of the ridge 32.

In assembly the mount D is first formed and then riveted as indicated at 25 to the plate E after the opening 26 has been formed in the plate E.

Then the opening 10 is formed in the plate A and serves as a mount for the bolt B which may be of ordinary construction.

When the bolt B is inserted through the opening 10, even upon slight canting or inclination, the shank 15 will find the threaded opening in the nut C and then may be screwed through the nut C until it strikes the wires 28 which will be slightly pressed apart and grip the shank sufficiently to prevent any unscrewing upon vibration of the mechanism to which the fastening device of the present invention is connected.

It will be noted, particularly in Fig. 5, that the legs 28 are not only spaced farther apart by the thread 15, but are also offset by the thread so as to enhance the gripping effect.

As is shown in Figs. 6 and 7, and Figs. 8 and 9, the nut C may be utilized, generally, as a locking device and used for bolts to eliminate the necessity of using a lock nut.

Similarly functioning parts, as in Figs. 2 and 4, are shown in Figs. 6 and 8 designated by the same numerals primed, while in Figs. 7 and 9 they are provided with a superior "2."

It will be noted in the embodiment of Figs. 6 and 8 that the sides of the hexagon nut C' are grooved as indicated at 50 and 51 so that the base 31' and the ends 33' of the wire 29' will not project beyond the sides 52 of the hexagon nut C'.

In the embodiments of Figs. 7 and 9, the hexagon nut $C^2$ is provided with a peripheral recess or groove 53 which receives the base $31^2$ and the ends $33^2$ of the resilient wire 29' or $29^2$.

In this construction this resilient member should be placed in the upper portion of the threaded element 15 so that it will not engage the tapped opening 40 until the bolt has been threaded part way into the nut C.

It is thus apparent that the applicant has provided a simple inexpensive lock nut arrangement which may be widely utilized and is of utilization in the specific application shown.

In this specific application shown the applicant has devised a manner of obtaining an automatic engaging bolt which will find its seat even though slightly canted or oblique without much manipulation.

It is apparent from the specific illustrations shown above that they have been given by way of illustration and not by way of limitation and that the structures above described are subject to wide variation and modification without departing from the scope or intent of the invention, all of which variations and modifications are to be included within the scope of the present invention.

What is claimed is:

In a connection device for two plates having openings positioned one above another when the plates are to be bolted together, a mount comprising side flanges situated over the sides of one of said openings and downwardly and inwardly extending fingers; a nut having an enlarged conical recessed inlet on its side away from said one opening and a threaded bore through the nut, said nut having an outer waist portion of reduced diameter, said fingers engaging said nut at said waist portion, whereby said mount permits oscillation of the nut, and a bolt extending through the other opening to be screwed into said threaded bore, said nut having a spring-receiving recess on its side close to said one opening and means preventing the nut from turning in its mounting.

JEREMIAH W. ALBIN.